United States Patent [19]

Ueda

[11] Patent Number: 5,773,960
[45] Date of Patent: Jun. 30, 1998

[54] ELECTRONIC EQUIPMENT DETECTING BATTERY VOLTAGE TO CONTROL POWER SUPPLY

[75] Inventor: Toshiyuki Ueda, Ikoma, Japan

[73] Assignee: Sharp Kabushiki Kaisha, Osaka, Japan

[21] Appl. No.: 749,052

[22] Filed: Nov. 14, 1996

[30] Foreign Application Priority Data

Nov. 17, 1995 [JP] Japan .................................. 7-299805

[51] Int. Cl.[6] ............................................... H02J 7/00
[52] U.S. Cl. .................................................. 320/127
[58] Field of Search ................... 320/5, 13, 29, 320/30, 43, 54, 55; 307/66, 125; 363/86, 89, 53

[56] References Cited

U.S. PATENT DOCUMENTS

| | | | |
|---|---|---|---|
| 4,609,982 | 9/1986 | Gohda | 363/89 |
| 4,945,300 | 7/1990 | Sato et al. | 323/318 |
| 5,266,840 | 11/1993 | Leipold et al. | 307/105 |
| 5,311,441 | 5/1994 | Tayama et al. | 364/483 |
| 5,546,589 | 8/1996 | Odaira | 395/750 |

FOREIGN PATENT DOCUMENTS 4-307613  10/1992  Japan .

*Primary Examiner*—Edward Tso
*Attorney, Agent, or Firm*—Nixon & Vanderhye P.C.

[57] ABSTRACT

An electronic equipment, which includes a detecting portion for detecting battery voltage, a switching portion for controlling supply of power to a high load device, and a control portion for controlling the switching portion to supply power to the high load device for a prescribed time period immediately after turning-on of power switch and for controlling the switching portion to stop supply of power to the high load device when the voltage detected by the detecting portion is not higher than a prescribed voltage.

7 Claims, 3 Drawing Sheets

CAUTION!
DO NOT PRINT

_5,773,960_

ELECTRONIC EQUIPMENT DETECTING BATTERY VOLTAGE TO CONTROL POWER SUPPLY

BACKGROUND OF THE INVENTION

1. Field of the Invention

The present invention relates to electronic equipment which operates by being driven by a battery, and particularly to electronic equipment which detects battery voltage to control power supply.

2. Description of the Background Art

Recently, many types of portable electronic equipment are being developed. Many of them are driven by a battery. In such battery-driven electronic equipment, particularly equipment with microprocessors, erroneous operations may occur if battery voltage is decreased by consumption of the battery. These erroneous operations may result in problems such as deletion of the contents of the memory, and thus it is a significant goal to prevent such problems.

In a conventional example such as the one disclosed in Japanese patent Laying-Open No. 4-307613, when battery voltage is detected upon turning-on of a power supply and the detected voltage is not higher than a prescribed voltage, it is generally indicated at a display portion. Then, by breaking the supply of power to a load circuit, it is possible to prevent an erroneous operation due to decrease in the battery voltage.

The conventional art described above has been able to deal with battery voltages gradually decreasing with a small load. However, lighting of a liquid crystal display backlight, communication with a modem, or the like are operable selectively and involve high load. The conventional art cannot accommodate rapid decrease in the battery voltage due to these high loads. This decrease in battery voltage leads to problems such as erroneous operation of the equipment, causing deletion of the contents of the storage devices such as memories due to runaway of the equipment.

In addition, interruption of all power occurs even when the fundamental functions of the equipment itself may not be affected if functions which require high load like lighting of the backlight, communication by the modem, and the like are not employed upon usage of the equipment.

SUMMARY OF THE INVENTION

It is an object of the present invention to provide an electronic equipment in which erroneous operation due to rapid decrease in battery voltage occurring when a high load device is driven can be prevented, and a method of controlling the same.

According to one aspect, an electronic equipment of the present invention includes a detecting portion for detecting battery voltage, a switching portion for controlling supply of power to a high load device, and a control portion for controlling the switching portion to supply power to the high load device for a prescribed time period immediately after a power supply switch is turned on and for controlling the switching portion to stop supply of power to the high load device when the voltage detected by the detecting portion is not higher than a prescribed voltage.

In accordance with another aspect of the present invention, a method of controlling a power supply of an electronic equipment includes the steps of supplying power to a high load device for a prescribed time period immediately after a power supply is turned on, detecting battery voltage, and stopping supply of power to the high load device when the detected voltage is not higher than a prescribed voltage.

Immediately after turning on the power supply switch, power is supplied to the high load device for a prescribed time period such that the device would be temporarily at a high load state. Then, when the battery voltage is not higher than the prescribed voltage, supply of power to the high load device is stopped, while supply of power to other portions is still continued.

Accordingly, by reducing the load to a considerably consumed battery, rapid a decrease in battery voltage can be prevented, thus preventing erroneous operations of the electronic equipment.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
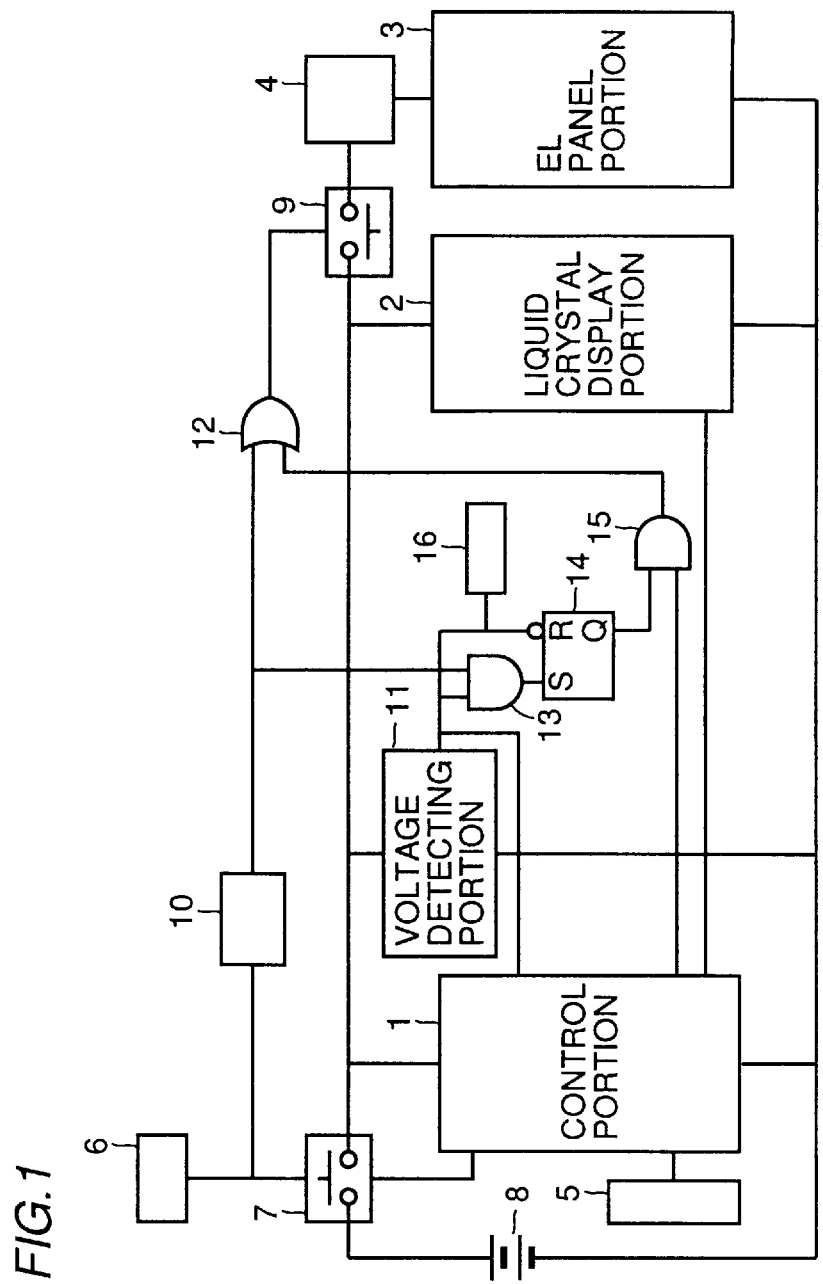
FIG. 1 is a block diagram of an electronic equipment according to one embodiment of the present invention.

An electronic equipment includes a control portion 1, a liquid crystal display portion 2, an EL (ElectroLuminescent) panel 3, an EL panel driving portion 4, a backlight ON/OFF switch 5, a power switch 6, a body power supply control portion 7, a battery 8, a load power supply control portion 9, a one-pulse generating portion 10, a voltage detecting portion 11, an OR circuit 12, AND circuits 13, 15, an S-R flip-flop 14, and a buzzer portion 16.

Referring to FIG. 1, control portion 1 is formed by, for example, a microprocessor for various types of control. Liquid crystal display portion 2 is a display device employing dot matrix scheme, having EL panel 3 integrally provided at its rear instead of a reflector. Liquid crystal display portion 2 also has a driver incorporated therein. It displays characters, figures and so on. When a caution is to be issued to the user, it is indicated on liquid crystal display portion 2. Information displayed on liquid crystal display portion 2 is successively sent from control portion 1. EL panel 3 emits light in response to reception of high voltage supply from EL panel driving portion 4 and functions as a backlight for liquid crystal display portion 2. Emittance of light from EL panel 3 will be described in detail later, but the basic outline is that the user is able to turn on (to light) or to turn off (to put off) the backlight on arbitrary decision by operation of backlight ON/OFF switch 5. When backlight ON/OFF switch 5 is operated with the backlight turned on, control portion 1 controls load power supply control portion 9 to put off the backlight. When backlight ON/OFF switch 5 is operated with the backlight off, control portion 1 controls load power supply control portion 9 to turn on the backlight.

Description will now be made for the operation when the power is turned on. In order to turn on the power of the device, power switch 6 is operated. As power switch 6, a contact type press button switch which is brought into contact only when pressed down, is adopted. Body power supply control portion 7 controls power from battery 8, and in response to signals form power switch 6, is repeatedly turned on and off. When body power supply control portion 7 is turned on, power from battery 8 is supplied to each portion. Although power is supplied to each portion by body power supply control portion 7, supply of power to high load devices is additionally controlled by load power supply control portion 9. Voltage from body power supply control portion 7 is supplied to control portion 1, one-pulse generating portion 10, voltage detecting portion 11, and liquid crystal display portion 2, respectively. One-pulse generating portion 10 detects start of supply of power and outputs one pulse having a predetermined width. For example, if the high load device is a backlight, it outputs a pulse having a width of 0.2 seconds. The pulse generated by one-pulse generating portion 10 is input to load power supply control portion 9 via OR gate 12. Load power supply control portion 9 supplies power to EL panel driving portion 4 for the time period of the width of the input pulse, regardless of whether backlight ON/OFF switch 5 is being pressed down. EL panel driving portion 4 supplied with power from load power supply control portion 9 produces voltage for driving EL panel 3, and supplies this voltage to EL panel 3.

Figures 2, 3:
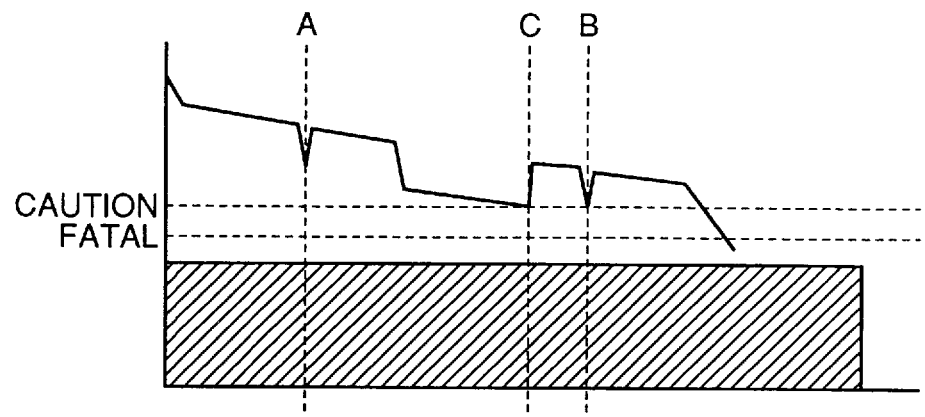
FIG. 2 shows how battery voltage is changed when a high load device is driven.
FIG. 3 shows an example of a display screen indicating a caution message.

By driving EL panel 3 which is a high load device, supply voltage of battery 8 is lowered. This voltage change is shown in FIG. 2 as a graph in which axis of abscissas represents the time while axis of ordinates represents the voltage. In the drawing, the shaded portion indicates the range of unstable voltage in which the equipment cannot perform a stable operation. Fatal voltage is a voltage value set higher than unstable operation voltage such that operation of the equipment within the range of unstable voltage is prevented. Caution voltage is the voltage for providing a caution, set still higher than the above-described Fatal voltage. In the present embodiment, usage of the high load device is inhibited when the battery voltage is not higher than the Caution voltage, and this inhibition is informed as a caution message.

The change in voltage when EL panel 3 is lighted for 0.2 seconds by turning-on of power is described with reference to FIG. 1 is shown in FIG. 2 as point A. Voltage detecting portion 11 compares the voltage from body power supply control portion 7 with the Caution voltage or the Fatal voltage. Voltage detecting portion 11 has an A/D converter incorporated therein which converts the voltage from body power supply control portion 7 into a numerical value and then makes a comparison with the Caution voltage or the Fatal voltage. An example of a simple A/D converter may be one which employs a method of dividing the supply voltage by resistance and makes a detection on whether that voltage is the same as or higher than a predetermined voltage or not.

At point A of FIG. 2, since the supply voltage is higher than Caution the voltage or the Fatal voltage even if EL panel is lighted, voltage detecting portion 11 outputs "1" to AND circuit 13 and R terminal of S-R flip-flop 14. To the other terminal of AND circuit 13, the output of one-pulse generating portion 10 is input. AND circuit 13 outputs "1" for only 0.2 seconds, for example, in response to a pulse from one-pulse generating portion 10. If voltage detecting portion 11 has determined that the supply voltage is higher than the Caution voltage so as to output "1" while one-pulse generating portion 10 is outputting "1" due to turning-on of power, AND circuit 13 outputs "1" to the S terminal of S-R flip-flop 14. As a result, "1" is set at the Q terminal of S-R flip-flop 14.

Meanwhile, at point B of FIG. 2, lighting of EL panel 3 causes the supply voltage to be no higher than the Caution voltage, and thus voltage detecting portion 11 outputs "0." As S-R flip-flop 14 is reset, "0" is input also to buzzer portion 16. Buzzer portion 16 is triggered by the fall of a signal output from voltage detecting portion 11 to generate a caution sound for a predetermined time period. By resetting of S-R flip-flop 14, "0" is input to one terminal of AND circuit 15. Accordingly, even when backlight ON/OFF switch 5 is operated and the signal for lighting EL panel 3 output from control portion 1 has become "0," EL panel 3 is not lighted, since the output of control portion 1 is masked by AND circuit 15 and the output of OR circuit 12 does not become "0."

The above description has been made for the operation when power of EL panel 3 is turned on. When body power supply is turned on, there is a possibility that, even when the battery voltage is sufficient as shown by point A of FIG. 2, it is made no higher than Caution voltage as shown by point C of the same drawing due to continuous usage. Since voltage detecting portion 11 is always detecting the battery voltage, S-R flip-flop 14 is reset when battery voltage is decreased to be no higher than the Caution voltage and buzzer portion 16 generates a caution sound, such that lighting of EL panel 3 can be terminated in this case also.

As described above, lighting of EL panel 3 is controlled by the state of S-R flip-flop 14. S-R flip-flop 14 is set only when body power is on due to operation of AND circuit 13. Even if EL panel 3 is turned off such that supply voltage is recovered, S-R flip-flop 14 would not be reset. It is possible to use the equipment without lighting EL panel 3 when supply voltage is decreased to be no higher than Caution voltage. However, when voltage detecting portion 11 determines that the battery voltage has lowered to be no higher than the Fatal voltage, it informs this to control portion 1, which controls body power supply control portion 7 to stop the supply of body power supply. Accordingly, it is possible to prevent usage of the equipment with unstable voltage.

Although EL panel 3 was employed as the high load device in the above description, the present invention is also applicable to an equipment incorporating, for example, a printer or the like. In this case, an liquid crystal display portion 2 may indicate that the printer cannot be used, as shown in FIG. 3.

Figure 4:
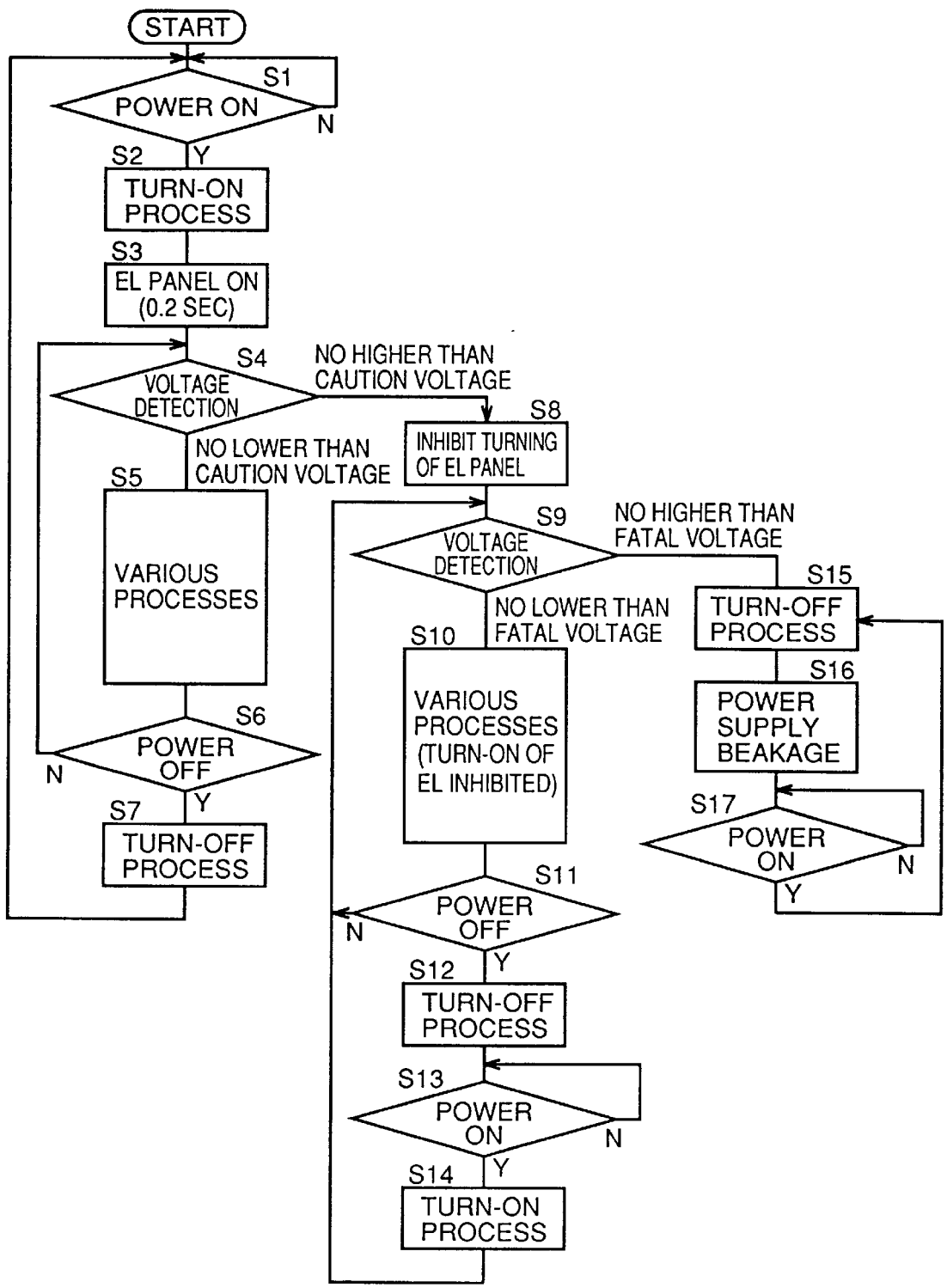
FIG. 4 is a flow chart of a procedure employed in the electronic equipment according to one embodiment of the present invention.

FIG. 4 is a flow chart showing the procedure according to this embodiment of the present invention.

Although not shown in FIG. 1, the electronic equipment includes a backup memory for holding data such as flags. The backup memory can hold data even when the body power supply is turned off.

At step S1, determination is made on whether the body power supply is turned on by the user or not. When it is detected that body power supply-is on at step S1, the process progresses to step S2. At step S2, initialization is performed for flag information and variables. At step S3, the high load device is driven for a predetermined period. If the high load device is EL panel 3 for liquid crystal display portion 2, EL panel 3 is driven and lighted for 0.2 seconds while voltage is measured under this condition where EL panel is lighted.

At step S4, determination is made on whether the voltage measured at step S3 is no higher than the Caution voltage. If it is no lower than the Caution voltage, the process progresses to step S5 where various normal processes can be performed. During the process of step S5, determination is still being performed at step S4 periodically until the user gives an instruction of turning off the body power supply. If it is determined that there has been an instruction of turning off the body power supply at step S6, progress is made to step S7 where a process for turning off the body power supply is performed, to be prepared for the next turning-on of power supply at step S1.

When it is determined that battery voltage is not higher than the Caution voltage at step S4, it is informed as a caution by buzzer portion 16, and thereafter, supply of power to EL panel 3 is stopped, at step S8. Then, a Caution flag in the backup memory is set. At step S9, the battery voltage is detected so as to determine whether it is not lower than the Fatal voltage. If it is not lower than the Fatal voltage, various operations are performed with supply of power to EL panel 3 stopped (S10).

process performed at steps S11 and S12 as well as S13 and S14 are similar to steps S6 and S7 as well as S1 and S2, respectively, and thus a detailed description thereof is not repeated here.

If it is determined that the battery voltage is not higher than the Fatal voltage at step S9, the process progresses to step S15 where the Fatal flag in the backup memory is set so as to perform a turning-off process, and thereafter, supply of power is interrupted at step S16. If body power supply is turned on at step S17, the process is returned to step S15 to perform a turning-off process such that power supply is not turned on again until the battery is exchanged.

In the flow chart of FIG. 4, each of steps S1, S13 and S17 involves a determination of whether body power supply is turned on or not. However, as soon as body power supply is turned on, control portion 1 must determine from which step the process is to be started. When neither the Caution flag and nor the Fatal flag is set, control portion 1 starts processing from step S2. When only the Caution flag is set, control portion 1 starts processing from step S14. In addition, when the Fatal flag is set, control portion 1 starts processing from step S15.

In the present invention, it is possible to prevent the equipment from being operated with unstable voltage due to high load device being suddenly driven, by forcing the high load device to be driven upon turning-on to determine the voltage.

As has been described above, by detecting reduction in voltage upon turning-on due to high load device being driven and by inhibiting usage of the high load device if the voltage is not higher than a predetermined voltage, it is possible to prevent erroneous operation of the equipment.

In addition, since the user is allowed to utilize the electronic equipment while usage of the high load device is inhibited, it is possible to make use of the battery effectively.

Although the present invention has been described and illustrated in detail, it is clearly understood that the same is by way of illustration and example only and is to be taken by way of limitation, the spirit and scope of the present invention being limited only by the terms of the appended claims.

What is claimed is:

1. An electronic equipment driven by a battery, comprising:

detecting means for detecting battery voltage;

first switching means for controlling supply of power to a high load device;

controlling means for controlling said first switching means to supply power to said high load device immediately after turning-on of a power switch, and for controlling said first switching means to stop the supply of power to said high load device when voltage detected by said detecting means is not higher than a prescribed voltage; and backup means for holding data even when the power switch is off, wherein said controlling means controls said first switching means to stop supply of power to said high load device and to set a flag at said backup means when voltage detected by said detecting means is not higher than said prescribed voltage, and controls said first switching means to refrain from supplying power to said high load device when said flag is set at said backup means at the time of turning-on of the power switch.

2. A method of controlling a power supply of an electronic equipment driven by a battery, comprising the steps of:

supplying power to a high load device for a prescribed time period immediately after power switch is turned on;

detecting battery voltage;

stopping supply of power to said high load device when said detected voltage is not higher than a first prescribed voltage;

setting a first flag which is not deleted even when the power supply is turned off when said detected voltage is not higher than said first prescribed voltage; and refraining from supplying power to said high load device when said first flag is set at the time of turning-on of power switch.

3. The method of controlling the power supply of the electronic equipment according to claim 2, further comprising the step of stopping supply of power of the entire said electronic equipment when said detected voltage is not higher than a second prescribed voltage.

4. The method of controlling the power supply of the electronic equipment according to claim 2, further comprising the steps of:

setting a second flag which is not deleted even when the power supply is turned off when said detected voltage is not higher than a second prescribed voltage; and stopping supply of power of the entire said electronic equipment when said second flag is set at the time of turning-on of power switch.

5. An electronic equipment driven by a battery, comprising:

detecting means for detecting battery voltage;

first switching means for controlling supply of power to a high load device;

controlling means for controlling said first switching means to supply power to said high load device immediately after turning-on of a power switch, and for controlling said first switching means to stop the supply of power to said high load device when voltage detected by said detecting means is not higher than a prescribed voltage;

second switching means for controlling supply of power of the entire electronic equipment; and backup means for holding data even when the power switch is off, wherein said controlling means controls said first switching means to supply power to said high load device immediately after turning-on of said power switch, and controls said first switching means to stop supply of power to said high load device when voltage detected by said detecting means is not higher than a first prescribed voltage, and then controls said second switching means to stop the supply of power of the entire said electronic equipment when voltage detected by said detecting means is not higher than a second prescribed voltage, and wherein said control means controls said first switching means to stop supply of power to said high load device and to set a first flag at said backup means when voltage detected by said detecting means is not higher than said first prescribed voltage and to set a second flag when voltage detected by said detecting means is not higher than said second prescribed voltage, and to control said first switching means to refrain from supplying power to said high load device when said first flag is set at said backup means at time of turning-on of power supply, and to control said second switching means to stop supply of power to said entire electronic equipment when said second flag is set at said backup means at the time of turning-on of power supply.

6. An electronic equipment driven by a battery, comprising:

a voltage detector which detects a voltage provided by said battery;

a first switch device provided between power supply and a high load device and operative to connect said power supply and said high load device;

a controller operatively connected with said first switch device and said voltage detector, said controller operable to control said first switch device to supply power to said high load device immediately after turning-on of a power switch, and operable to control said first switch device to interrupt the supply of power to said high load device when the battery voltage detected by said voltage detector is at or below a prescribed voltage; and a backup data storage device which holds data even when power is off, wherein said controller is further operable to control said first switch device to stop supply of power to said high load device and to set a flag at said backup storage device when voltage detected by said voltage detector is at or below said prescribed voltage, and to control said first switch device to power from being supplied to said high load device when said flag is set at said backup storage device at the time of turning-on of the power switch.

7. An electronic equipment driven by a battery, comprising:

a voltage detector which detects a voltage provided by said battery;

a first switch device provided between power supply and a high load device and operative to connect said power supply and said high load device;

a controller operatively connected with said first switch device and said voltage detector, said controller operable to control said first switch device to supply power to said high load device immediately after turning-on of a power switch, and operable to control said first switch device to interrupt the supply of power to said high load device when the battery voltage detected by said voltage detector is at or below a prescribed voltage;

a second switch device operative to connect power to said electronic equipment; and a backup data storage device which holds data even when power is off, wherein said controller is further operable to control said first switch device to stop supply of power to said high load device and to set a flag at said backup storage device when voltage detected by said voltage detector is at or below said prescribed voltage, and to control said first switch device to power from being supplied to said high load device when said flag is set at said backup storage device at the time of turning-on of the power switch, and wherein said controller is operable to control said first switch device to supply power to said high load device immediately after turning-on of said power switch, and to control said first switch device to stop supply of power to said high load device when voltage detected by said voltage detector is at or below a first prescribed voltage, and then to control said second switch device to stop the supply of power of the entire said electronic equipment when voltage detected by said voltage detector is not higher than a second prescribed voltage.

* * * * *